United States Patent
Small et al.

(10) Patent No.: US 8,056,860 B2
(45) Date of Patent: Nov. 15, 2011

(54) METHOD AND SYSTEM FOR INFLIGHT REFUELING OF UNMANNED AERIAL VEHICLES

(75) Inventors: James Small, Tucson, AZ (US);
Frederick Davidson, Tucson, AZ (US);
Carlos Garcia, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/806,377

(22) Filed: Aug. 10, 2010

(65) Prior Publication Data

US 2010/0321011 A1 Dec. 23, 2010

Related U.S. Application Data

(62) Division of application No. 11/891,959, filed on Aug. 13, 2007, now Pat. No. 7,798,449.

(51) Int. Cl.
*B64D 39/00* (2006.01)

(52) U.S. Cl. ............... 244/135 A; 244/135 R; 244/1 TD

(58) Field of Classification Search .............. 244/135 A, 244/135 R, 1 TD
See application file for complete search history.

(56) References Cited

U.S. PATENT DOCUMENTS

| | | | |
|---|---|---|---|
| 2,941,761 A * | 6/1960 | Cox et al. | 244/135 A |
| 3,617,866 A | 11/1971 | Dowsett et al. | |
| 3,794,270 A * | 2/1974 | Wilkens | 244/172.4 |
| 4,381,092 A * | 4/1983 | Barker | 244/172.4 |
| 5,131,438 A * | 7/1992 | Loucks | 141/1 |
| 5,906,336 A * | 5/1999 | Eckstein | 244/135 A |
| 6,604,711 B1 * | 8/2003 | Stevens et al. | 244/135 A |
| 6,644,594 B1 | 11/2003 | Hunn et al. | |

(Continued)

FOREIGN PATENT DOCUMENTS

WO WO-2009073052 A2 6/2009

(Continued)

OTHER PUBLICATIONS

"U.S. Appl. No. 11/891,959, Non Final Office Action mailed Dec. 30, 2009", 24 pgs.

(Continued)

*Primary Examiner* — Tien Dinh
*Assistant Examiner* — Justin Benedik
(74) *Attorney, Agent, or Firm* — Schwegman, Lundberg & Woessner, P.A.; Gregory J. Gorrie

(57) ABSTRACT

A system and method for refueling unmanned aerial vehicles. The system is adapted to refuel a first unmanned aerial vehicle from a second unmanned aerial vehicle and includes an arrangement for flying the first and second vehicles to proximity within a predetermined range and for connecting an umbilical from the second vehicle to the first vehicle in flight. In the illustrative embodiment, the arrangement for connecting includes a targeting system for electromagnetically detecting a refueling receptacle on the first vehicle. The targeting system includes a first coil around a refueling receptacle on the first vehicle. A seeker is disposed at a first end of said umbilical on the second vehicle. The seeker includes three detector coils adapted to detect a magnetic signal from the first coil around the receptacle on the first vehicle. The coils are mounted such that the detector coils point in different directions. The outputs of the coils are processed to determine the direction and range to the UAV from the tanker UAV.

11 Claims, 9 Drawing Sheets

U.S. PATENT DOCUMENTS

| | | | |
|---|---|---|---|
| 6,669,145 B1 * | 12/2003 | Green | 244/135 A |
| 6,819,982 B2 | 11/2004 | Doane | |
| 6,869,042 B2 * | 3/2005 | Harrison | 244/2 |
| 6,889,941 B1 * | 5/2005 | McElreath et al. | 244/135 A |
| 6,960,750 B2 | 11/2005 | Doane | |
| 6,966,525 B1 * | 11/2005 | Schroeder | 244/135 A |
| 6,988,693 B2 * | 1/2006 | Shelly | 244/135 A |
| 6,994,294 B2 * | 2/2006 | Saggio et al. | 244/135 A |
| 7,007,894 B1 * | 3/2006 | Takacs et al. | 244/135 A |
| 7,036,770 B2 * | 5/2006 | Shelly et al. | 244/135 A |
| 7,185,854 B2 * | 3/2007 | Von Thal et al. | 244/135 A |
| 7,543,779 B1 | 6/2009 | Lewis et al. | |
| 7,798,449 B2 | 9/2010 | Small et al. | |
| 2006/0145023 A1 * | 7/2006 | Babb et al. | 244/172.4 |

FOREIGN PATENT DOCUMENTS

| | | | |
|---|---|---|---|
| WO | WO-2009073052 A3 | 6/2009 | |
| WO | WO-2009073052 A9 | 6/2009 | |

OTHER PUBLICATIONS

"U.S. Appl. No. 11/891,959, Notice of Allowance mailed May 12, 2010", 6 pgs.

"U.S. Appl. No. 11/891,959, Response to Non Final Office Action mailed Dec. 30, 2009", 12 pgs.

"International Application Serial No. PCT/US2008/09682, Search Report mailed May 12, 2009", 4 pgs.

"International Application Serial No. PCT/US2008/09682, Written Opinion mailed May 12, 2009", 6 pgs.

J. Sherman, Sierra Nevada Corp; OCTEC Ltd., Inside Washington Publishers, Sep. 22, 2006.

Prof. Benjamin Landkor & Robert Zickel, Techion-lsrael Institute of Technology, www.techion.ac.il, UAV to UAV Refueling System, 47th Israel Annual Conference on Aerospace Sciences, Tel Aviv, Israel, Feb. 20, 2007.

Office Action mailed Dec. 30, 2009 in connection with Parent U.S. Appl. No. 11/891,959 entitled: Method and System for Inflight Refueling of Unmanned Aerial Vehicles.

* cited by examiner

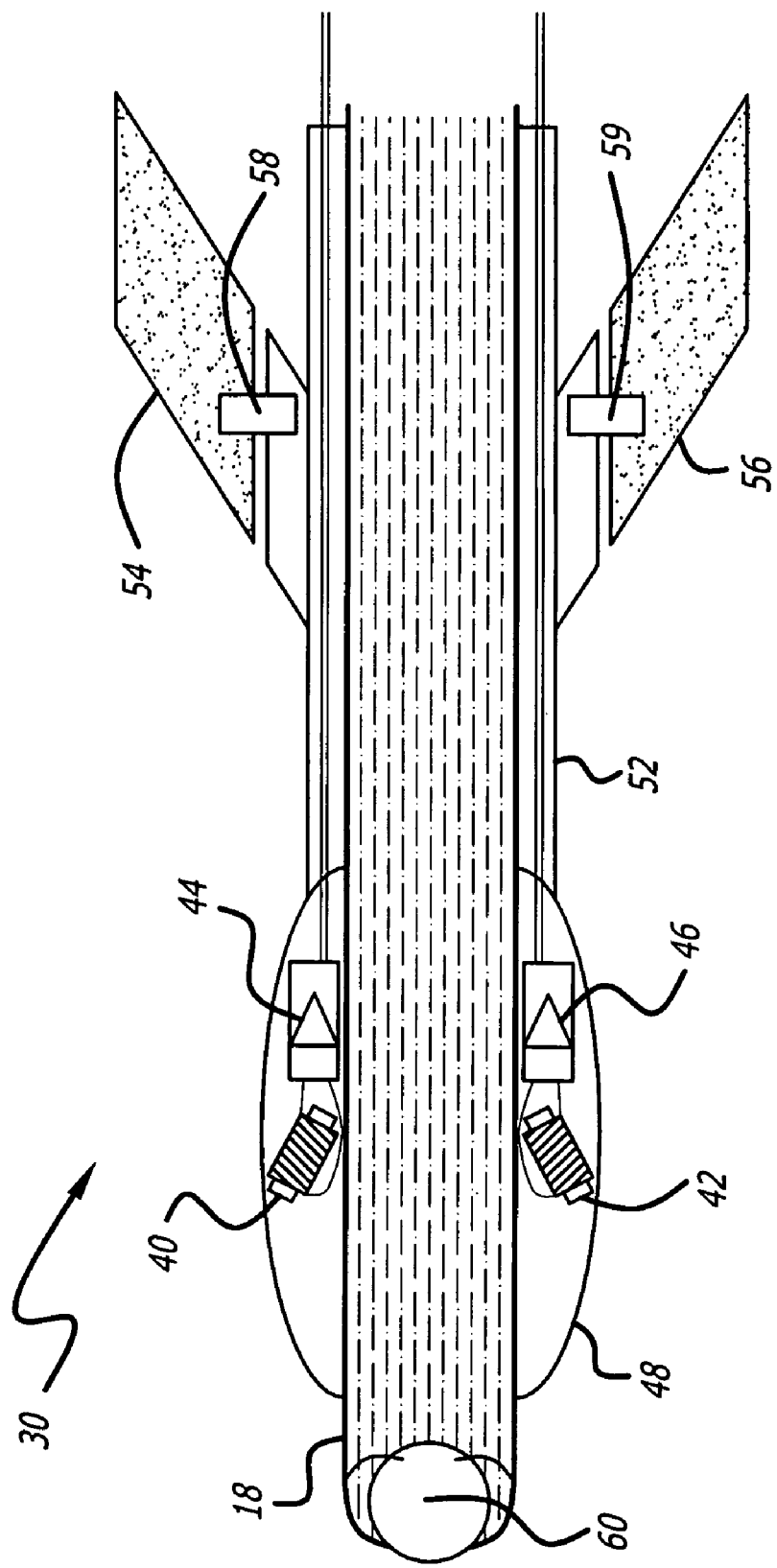

METHOD AND SYSTEM FOR INFLIGHT REFUELING OF UNMANNED AERIAL VEHICLES

CROSS-REFERENCE TO RELATED APPLICATION

This is a Divisional Application of U.S. patent application filed Aug. 13, 2007 by James Small et al., Ser. No. 11/891,959, now U.S. Pat. No. 7,798,449 entitled METHOD AND SYSTEM FOR INFLIGHT REFUELING OF UNMANNED AERIAL VEHICLES the teachings of which are incorporated herein by reference.

BACKGROUND OF THE INVENTION

1. Field of the Invention

The present invention relates to aeronautics. More specifically, the present invention relates to systems and methods for refueling vehicles in flight.

2. Description of the Related Art

The use of unmanned air vehicles (UAVs) for various military and civilian applications is rapidly expanding. A typical UAV flight has three parts to its mission: 1) it must be launched from a support base and fly to an area of operation; 2) it must loiter in its area of operation while performing its intended functions; and 3) it must fly back to its support base and land while carrying sufficient spare fuel to account for unforseen delays such as unfavorable headwinds.

At takeoff, a UAV must carry sufficient fuel for all three phases of its mission. It is often the case that mission parts 1 and 3 will each consume as much fuel as mission part 2, which is the useful portion of its total flight.

If a UAV can be refueled in-flight in its area of operation, a substantial increase in utility may be achieved. Hence, there is a growing need for a system or method for refueling UAVs in flight to allow the UAV to remain on-station for extended periods without consuming time and fuel to return to its support base.

Unfortunately, currently, it is generally not feasible for UAVs to be refueled from conventional manned tanker aircraft. There are two primary reasons. First, most UAVs are much smaller and fly slower than conventional manned tankers, which have been designed to refuel large jet-powered aircraft. It is necessary that the tanker have a flight performance roughly comparable to the UAV in order to perform close formation flight during refueling operations. Specially constructed tanker aircraft will generally be required to refuel most UAVs.

Second, aircrews of manned tanker aircraft are unwilling to permit unmanned aircraft to fly in close formation for safety reasons. During manned refueling operations, skilled pilots are in control of both the tanker and receiving aircraft. There is considerable danger to the human crews in both aircraft should any collision occur during the extremely close formation flight. Pilots of both aircraft place a very high degree of trust in the skill and competence of the other pilot. They are unwilling to rely on the response of robotic unmanned vehicles that may not be able to react to unforeseen problems. An unmanned tanker aircraft will generally be required for in-flight refueling of UAVs.

Hence, a need remains in the art for a safe and cost-effective system or method for refueling a UAV in flight.

SUMMARY OF THE INVENTION

The need in the art is addressed by the system and method for refueling unmanned aerial vehicles of the present invention. In the system implementation the invention is adapted to refuel a first unmanned aerial vehicle from a second unmanned aerial vehicle and includes an arrangement for flying the first and second vehicles to proximity within a predetermined range and for connecting an umbilical from the second vehicle to the first vehicle in flight using a novel magnetic targeting system.

In the illustrative embodiment, the targeting system includes a first coil around a refueling receptacle on the first vehicle. A seeker is disposed at a first end of said umbilical on the second vehicle. The seeker includes multiple detector coils adapted to detect a magnetic signal from the first coil around the receptacle on the first vehicle. The coils are mounted such that the detector coils point in different directions. The outputs of the coils are processed to determine the direction and range to the mission UAV from the tanker UAV.

In the illustrative embodiment, the inventive method includes the steps of flying the first and second vehicles to proximity within a predetermined range and connecting an umbilical from the second vehicle to the first vehicle in flight using the magnetic targeting system. More generally, a targeting method is disclosed including steps of: providing a plurality of coils for detecting a magnetic field; pointing each of said coils for optimal sensitivity of said field in a different direction; and processing signals output by said coils to locate a target. In the illustrative embodiment, the targeting system includes a coil disposed around a target on a first platform; an arrangement for activating the coil; and an arrangement disposed on a second platform for sensing a field radiated by the coil.

A novel detector arrangement is also disclosed. The novel detector includes a plurality of coils for detecting a magnetic field; an arrangement for pointing each of the coils for optimal sensitivity of the field in a different direction; and an arrangement for processing signals output by the coils to determine a location of an object.

BRIEF DESCRIPTION OF THE DRAWINGS

FIG. 7 is a sectional side view of a portion of the seeker of FIG. 1 in accordance with an illustrative embodiment of the present teachings.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
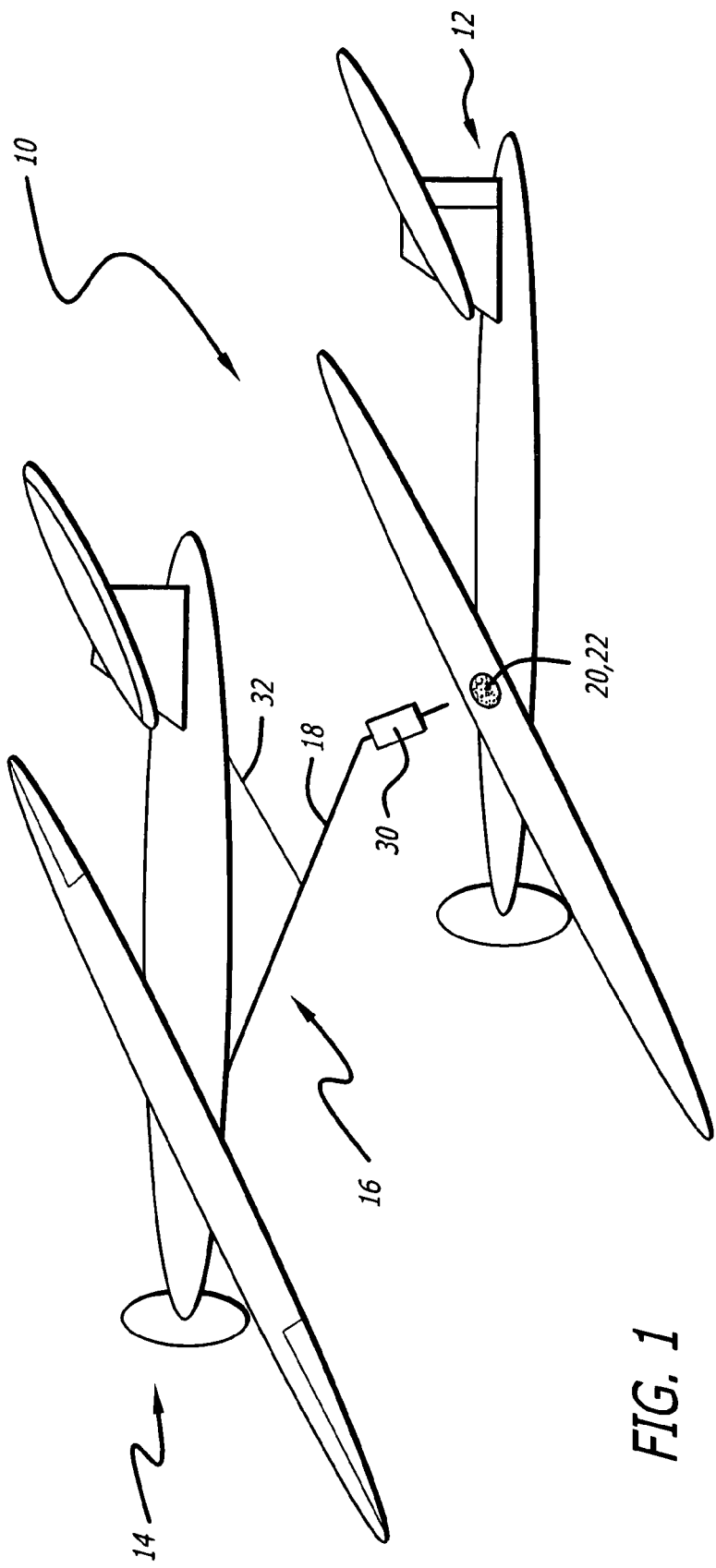
FIG. 1 is a simplified aerial view showing two unmanned aerial vehicles in flight flying in close proximity to effect autonomous refueling in accordance with an illustrative embodiment of the present teachings.

FIG. 1 is a simplified aerial view showing two unmanned aerial vehicles in flight flying in close proximity to effect autonomous refueling in accordance with an illustrative embodiment of the present teachings. As shown in FIG. 1, the system 10 includes a mission UAV 12, a tanker UAV 14 and a novel magnetic targeting arrangement 16 for guiding an umbilical 18 to effect a refueling coupling between the two vehicles. Each UAV has an airframe, control surfaces and guidance, navigation, communication and propulsion systems as is common in the art.

As per conventional teachings, the mission UAV 12 has the following systems:
1. Mission Package: Mission Data Link, sensors, other payloads (i.e. a broadcast transmitter, guided missiles, etc).
2. Flight Systems: engine and fuel management, flight instruments, flight control servos, autopilot computer.
3. Navigation Systems: GPS receiver, inertial navigator, air traffic radar transponder, collision avoidance systems.
4. Flight Management Computer:
    Contains pre-programmed course, waypoints, altitude, and speed information.
    Directs the autopilot, engine, takeoff and landing sequence, collision avoidance maneuvers, etc.
    Monitors fuel consumption, electric power, and other vehicle health information.
    Communicates with the Ground Control Operator and receives mission change instructions.
    Executes fail-safe maneuvers if control links are lost.
5. Control Data Links:
    May include two or more redundant radio links from the UAV to the Ground Control pilot-operator.
    Includes transmitters, receivers, antennas, possibly a satellite tracking antenna.
    Also provides for transmission security such as encryption, passwords, bit error checking.
    Provides a two-way voice channel to the Ground Controller for air-to-air communication.
6. Air Traffic Radios:
    Typically the Ground Controller is able to communicate from the UAV to other aircraft and Air Traffic Control. Conventional aircraft radios are installed on the UAV. They are operated through the Control Data Link.

For mid-air refueling in accordance with the present teachings, the mission UAV 12 will have the following additional systems:
1. a refueling port:
    a fixed port on the UAV structure or alternately a flexible hose and basket which are deployed during refueling;
2. software in the flight management computer to communicate position information to the tanker UAV; and
3. a precision guidance system to allow an unmanned tanker to connect to the fuel port.

In accordance with the present teachings, the tanker UAV 14 operates as another UAV in the air space and has systems similar to the mission UAV 12 including:
1. a ground control station and human pilot-operator;
2. the mission package will include a large fuel tank, pumps, metering sensors, and a deployable fuel probe; and
3. flight systems, navigation systems, flight management computer, control data links, air traffic radios.

In addition, as discussed more fully below, the tanker is designed to locate the mission UAV, intercept its course, join up in close formation, and maneuver its fuel probe to connect with the fuel port on the mission UAV.

In addition, the tanker includes:
a system for precision maneuvering of a fuel probe either by maneuvering the entire aircraft and/or separately steering the probe;
a precision guidance system to direct the fuel probe to the mission UAV fuel port; and
probe sensors to detect mechanical strains after a mechanical latch has been achieved.

In accordance with the invention, when the mission UAV 12 is in need of fuel, it will enter a standardized holding pattern that has been approved by an air traffic controller. As is common in the art, the holding pattern may be a racetrack path flown at constant altitude in a block of airspace that has been cleared of other aircraft operations. The unmanned tanker aircraft 14 will be directed to the holding area by its ground control station. The receiving mission UAV 12 may continuously transmit its position and altitude information by radio. The position information may be derived from an onboard satellite navigation receiver such as a Global Positioning Satellite (GPS) receiver.

The mission computer on board the tanker UAV 14 compares the received information to its own position and calculates a safe intercept course. For example, the tanker 14 may approach the receiver from above and slightly ahead as shown in FIG. 1. Many other approach configurations are possible.

Once the tanker and receiver are in loose formation flight, the tanker will transition to close formation flying. In general, the tanker aircraft will be equipped with special systems to permit both loose and close formation flight. By placing most specialized systems in the tanker 14, the receiving UAV 12 will require minimal modification to permit it to participate in in-flight refueling. Since a tanker aircraft may service multiple receiving aircraft, it is cost effective to place specialized systems mostly in the tanker.

Loose formation flying may be defined as coordinated flight between two aircraft which can be accomplished by reference to external radio navigation aides such as the GPS system. Close formation flight may be defined as the extreme positional accuracy required for the tanker UAV to connect its refueling probe to a receptacle on the receiving UAV. In general, the tanker must maneuver its refueling probe to close proximity (e.g. within approximately 2 centimeters of the receiving receptacle) in order to achieve a mechanical latch. The tanker must then maintain close formation flight during the transfer of fuel. This extreme precision must be accomplished while both aircraft are subject to unpredicted changes in winds and turbulent air currents.

Close formation flying may be achieved by providing a cooperative target on the receiving UAV and a matched seeker mechanism on the tanker UAV. Many embodiments of cooperative targets are possible. For example, the receiving target may emit radio signals, optical signals, magnetic fields, electric fields, radioactive emissions, or acoustic signals. From these emissions, the seeker on the tanker is able to derive direction and range information to the cooperative target. This information is used by a computer on the tanker for two functions. It provides guidance information to flight controls on the tanker aircraft to maintain close flight. It also provides guidance information used to independently maneuver the refueling probe as it approaches the receiving receptacle As a practical matter, many of the above listed emissions are unsuitable or have serious limitations for seekers for unmanned aerial refueling probes. For example, it would seem reasonable for the target aircraft to radiate a radio wave that the tanker could use as a homing signal. In practice, radio waves are not a good choice for very close homing distances. When radio (or microwave) waves are radiated, they are subject to strong multipath reflections from various parts of the nearby aircraft body. Furthermore, as the seeker antenna approaches a radio wave source, it merges the near field patterns and side lobes of both the transmitting and receiving antennas. The result is confused and rapidly changing apparent directions to the target.

Another reasonable seeker approach might be to use optical sources and detectors. The target could be provided with flashing lights and the seeker can use well-known optical imaging methods to provide guidance signals. As a practical matter, the optical seeker suffers from several deficiencies. Most simple optical systems have a limited field of view. The complexity of the optical system rises rapidly when it is required to search a very large field of view to find the active target. Most importantly, optical systems are very easily disrupted by fog, rain, water drops on the optical surfaces, mud and oil that may be common in aircraft operations.

Figure 2:
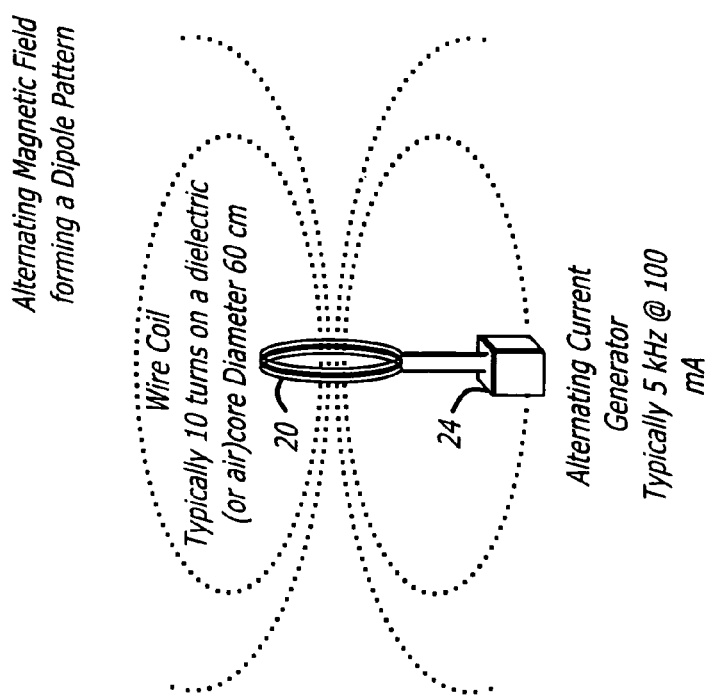
FIG. 2 is a diagram that illustrates the generation of a magnetic field by an energized coil.

In accordance with the present teachings, a coil 20 is provided around a receptacle 22 of the mission UAV 12. The coil 20 is powered with an electrical current and emits a magnetic field in response thereto. This is illustrated in FIG. 2. The magnetic field is sensed by a seeker 30 disposed at the end of the umbilical (fuel probe) 18 of the tanker UAV 14. In the preferred embodiment, the seeker 30 includes multiple detector coils (not shown in FIG. 1) that sense the magnetic field emanated by the receptor coil 20.

The signals are processed to provide range and direction precision guidance commands to a mechanism to maneuver the umbilical as discussed more fully below. In FIG. 1, the mechanism is a boom 32.

FIG. 2 is a diagram that illustrates the generation of a magnetic field by an energized coil. FIG. 2 shows a cooperative target and seeker based on the principle of magnetic induction. When a current flows through a wire loop or coil, a dipole magnetic field pattern develops in the near space surrounding the coil. If the current flowing through the coil is alternating current, then an alternating dipole magnetic field is generated in the vicinity of the coil. The alternating magnetic field readily induces voltages and currents in any nearby unpowered coils, which may be used in a seeker. It is important to note that the dipole magnetic field is not a radiated radio wave. With dipole sources, the magnetic field strength drops very rapidly with distance from the source coil. In general, the magnetic field strength decreases with distance R from the energized coil by a factor of $(I/R)^3$. That is, magnetic induction signals drop off in signal strength approximately as $1/(range^3)$. This is a very rapid drop.

Since the signal strength drops so rapidly with distance, the range to the target may be estimated quite accurately by simply measuring the strength of the detected signal. If the source strength of the target is held constant, measuring the received strength gives a very good estimate of the range to the target. Unlike radar systems, it is not necessary to send two-way signals to measure range. With the coil dimensions and drive current shown in FIG. 2, the target can be located a distance of (e.g. 15 meters) from the seeker. In accordance with the present teachings, a seeker uses plural detector coils to determine direction to the target in two dimensions. Each coil points in a different direction. The coil which is most closely aligned with the source produces the strongest signal. When the signal is equally balanced in all coils, the target lies directly ahead. The seeker logic (discussed below) provides output signals to adjust the flight controls and to maneuver the refueling probe.

Hence, the coil 20 is activated by an alternating current from a generator 24. In an illustrative embodiment, the coil 20 has 10 turns, of a suitable conductor such as 18 gauge copper wire, wrapped on a dielectric or air core of diameter of approximately 60 centimeters and the generator 24 outputs an alternating current of approximately 100 milli-amperes at 5 kilohertz (kHz). Those skilled in the art will appreciate that the present invention is not limited to the coil design or the level or frequency of the power applied thereto.

Figure 3:
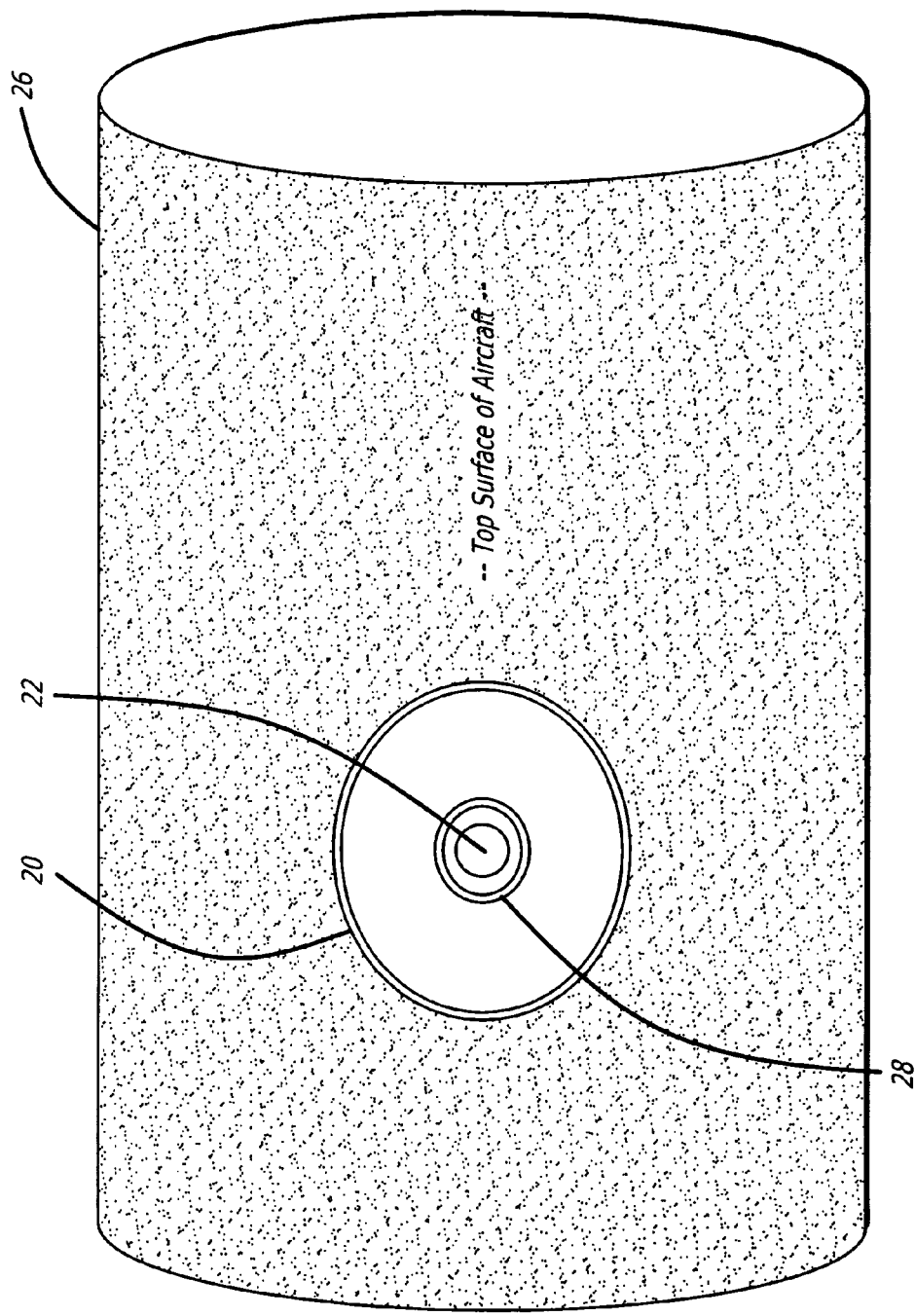
FIG. 3 is a top view of a section of the mission UAV of FIG. 1 in a first embodiment of the coil thereof in accordance with the present teachings.

FIG. 3 is a top view of a section of the mission UAV 12 of FIG. 1 in a first embodiment of the coil thereof in accordance with the present teachings. In this embodiment, the coil 20 is disposed around a refueling port or receptacle 22 in an aperture provided in a top surface 26 of the airframe of the mission UAV 12. As shown in FIG. 3, in the best mode, an optional second coil 28 is included for more precise targeting as discussed more fully below.

Figure 4:
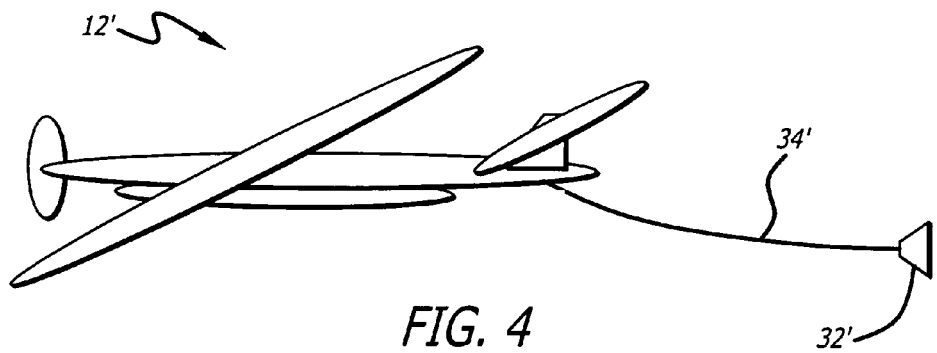
FIG. 4 is a side view the mission UAV of FIG. 1 in a second embodiment in accordance with the present teachings by which the receptor coil is disposed in a basket coupled to the UAV via a flexible fuel line.

FIG. 4 is a side view the mission UAV 12' of FIG. 1 in a second embodiment in accordance with the present teachings by which the receptor coil 20' is disposed in a basket 32' coupled to the UAV via a flexible (e.g. rubber) fuel line 34'.

Figure 5:
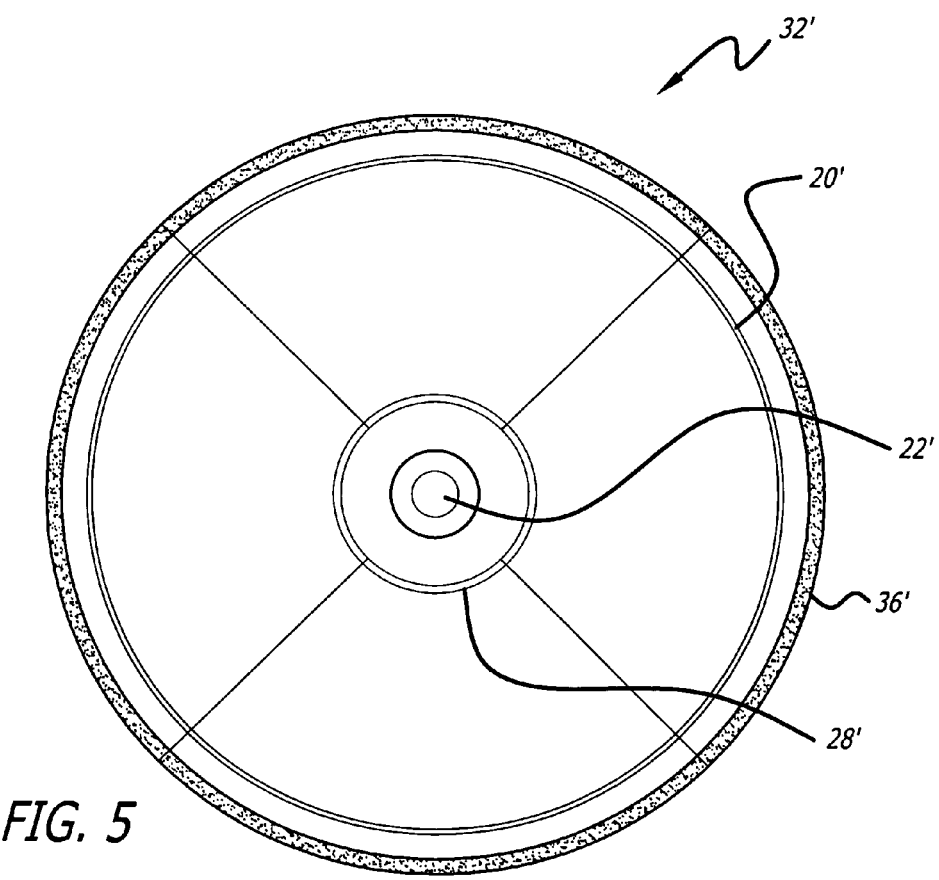
FIG. 5 is an end view of an illustrative embodiment of the basket of FIG. 4.

FIG. 5 is an end view of an illustrative embodiment of the basket 32' of FIG. 4. As shown in FIG. 5, the basket 32' includes a cone 36' fabricated of metal, plastic, or fabric with a fuel port 22' disposed at a center portion thereof in communication with a fuel reservoir (not shown) on the UAV 12. The first coil 20' is disposed at a distal end of the basket 32' relative to the fuel port 22'. A second coil 28' is disposed between the first coil 20' and the fuel port 22'. Those skilled in the art will appreciate that the invention is not limited to the fabrication of the basket. That is, the basket 32' may be of a solid, mesh or web construction and/or shaped to fly in a desired manner without departing from the scope of the present teachings.

Figure 6:
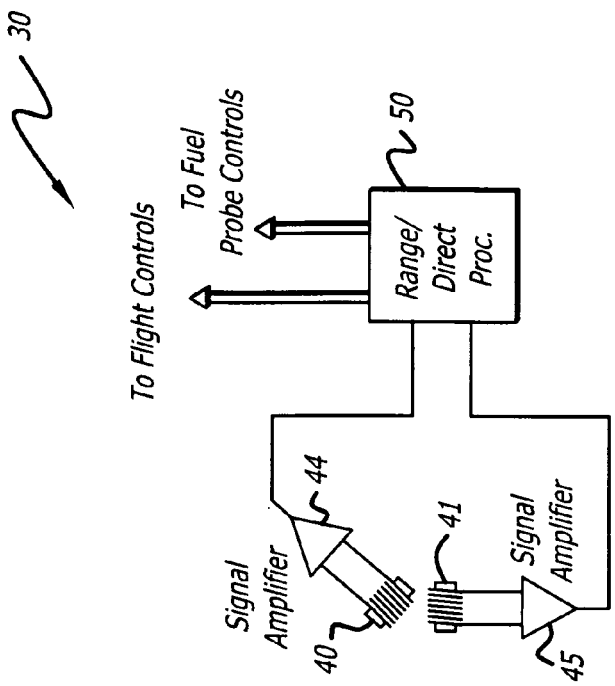
FIG. 6 is a simplified diagram of the fuel probe seeker of the system of FIG. 1 in accordance with the present teachings.

FIG. 6 is a simplified diagram of the fuel probe seeker of the system of FIG. 1 in accordance with the present teachings. In the best mode, the seeker 30 includes four detector coils 40-43 (of which only two are shown in FIG. 6). In the illustrative embodiment, each detector coil is implemented with 400 turns of a suitable conductor such as 22 gauge copper wire around an iron core approximately 2 centimeters in diameter. The detector coils are mounted to point in separate directions. The detector coils sense the magnetic field radiating from the receptor coils. The output of each detector coil is amplified by an associated amplifier 44-47 and input to a processor 50. The coil which points most directly toward the receptor coil 20 of the mission UAV will have the largest signal amplitude. The processor 50 compares the outputs of the detector coils and calculates the range and direction to the receptor coil 20 as discussed more fully below. The range and direction processor 50 may be implemented in discrete logic circuits, field-programmable gate arrays, application-specific integrated circuits, or other suitable means. In the best mode, the processor 50 is implemented in software adapted to run on a general-purpose computer (not shown) as discussed more fully below.

FIG. 7 is a sectional side view of a portion of the seeker of FIG. 1 in accordance with an illustrative embodiment of the present teachings. As shown in FIG. 7, the seeker 30 includes four magnetic detector coils 40-43 (of which only two 40, 42 are shown in FIG. 7). The coils 40, 42 are disposed within a nonmetallic housing 48 at a distal end of the fuel line 18. The amplifiers 44-47 are also disposed within the housing 48. Wiring from the amplifiers is enclosed within a sheath 52 around the fuel line 18 and as discussed more fully below, outputs signals at 5 and 7 kHz in an illustrative embodiment thereof.

As is common in the art, the fuel line 18 has a ball and spring check valve arrangement 60 at the distal end thereof. The spring loaded ball check valve 60 is designed to open the line 18 and permit fuel to flow therethrough after a successfully latching operation.

Figures 8, 9:
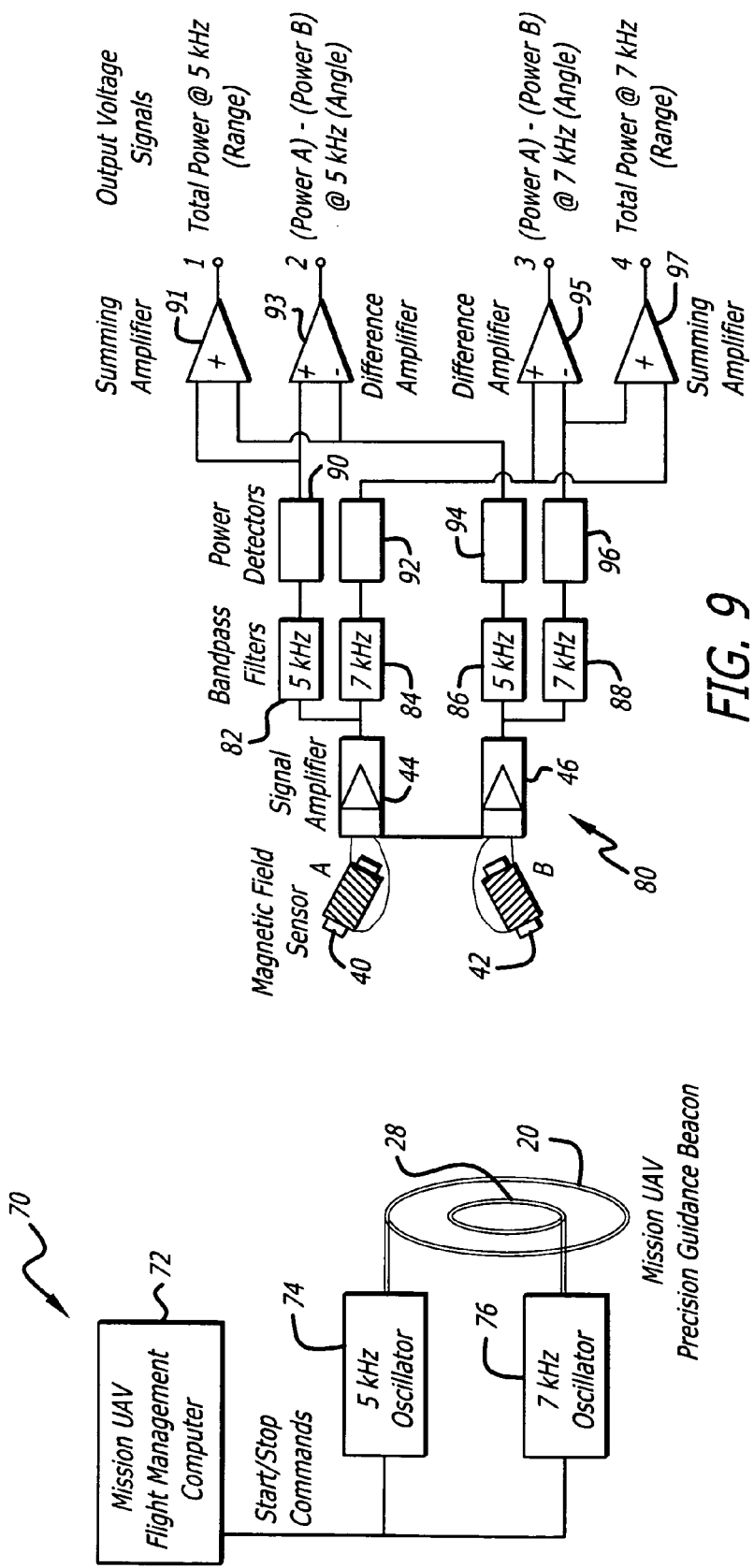
FIG. 8 is a simplified block diagram of the electrical subsystem of the mission UAV in accordance with an illustrative embodiment of the present teachings.
FIG. 9 is a simplified diagram of the seeker electronics of an illustrative implementation of the UAV tanker seeker/targeting system of the present invention.

FIG. 8 is a simplified block diagram of the electrical subsystem of the mission UAV in accordance with an illustrative embodiment of the present teachings. As shown in FIG. 8, in the preferred embodiment, the mission UAV electrical subsystem 70 includes first and second signal sources 74 and 76 which operate under control of a conventional onboard flight management computer 72. The first source 74 drives the first coil 20 and the second source drives the second (inner) coil 76. In the illustrative embodiment, the first and second sources 74 and 76 are oscillators operating at 5 kHz and 7 kHz, respectively.

FIG. 9 is a simplified diagram of the seeker electronics of an illustrative implementation of the UAV tanker seeker/targeting system of the present invention. As shown in FIG. 9, the seeker electronic subsystem 80 includes a set of bandpass filters (e.g. 82, 84) for each detector coil (of which only two 40, 42 are shown in FIG. 9). Each bandpass filter (BPF) is coupled to an associated power detector 90, 92, 94 or 96. It should be noted that this embodiment has four detector coils and four amplifiers are included along with eight bandpass filters and eight power detectors. Nonetheless, the invention is not limited to the number of detectors or the arrangement by which the detector outputs are processed. Each power detector outputs a voltage proportional to the power level of the signal detected by the associated coil.

In FIG. 9, the first and third detectors illustrated 40 and 42 are coaxial for the purpose of discussion. It should be understood that the second and fourth detectors 41 and 43 (not shown) are also coaxial with respect to an axis that is orthogonal with respect to that of the first and third detectors and coupled an identical circuit 80. Hence, the following discussion with respect to signal processing will be understood to apply to both sets of detectors. The magnetic signal from each receptor coil 20, 28 as detected by each detector coil 40 is summed with the signal from the other detector coil 42 for a given axis to determine range by first and second summing amplifiers 91 and 97. Likewise, the magnetic signal from each receptor coil 20, 28 as detected by each detector coil 40 is subtracted from the signal from the other detector coil 42 for a given axis to determine direction by first and second summing amplifiers 91 and 97. The range and direction values from the sum and difference amplifiers for each axis, provided by each pair of detector coils 40/42 and 41/43, are fed into a precision guidance computer 100 illustrated in FIG. 10.

Figure 10:
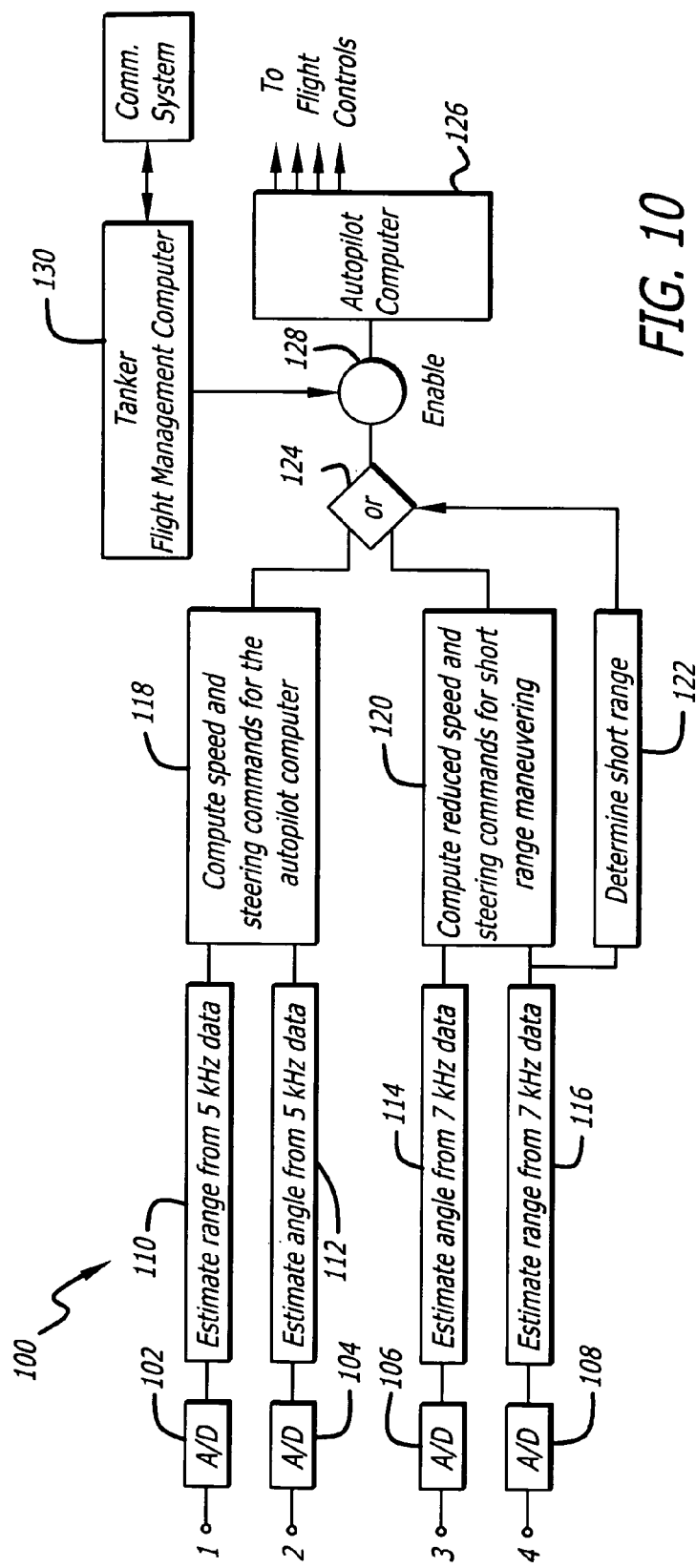
FIG. 10 is a block diagram of an illustrative implementation of a UAV tanker seeker precision guidance computer in accordance with an illustrative embodiment of the present teachings.

FIG. 10 is a block diagram of an illustrative implementation of a UAV tanker seeker precision guidance computer in accordance with an illustrative embodiment of the present teachings. The computer 100 includes an analog-to-digital A/D converter 102, 104, 106, and 108 for each of the amplifiers 91, 93, 95 and 97, respectively, of FIG. 9. Next, a first processor 110 estimates range with respect to the magnetic signal detected from the outer coil 20 of FIG. 8 and a second processor 116 estimates range with respect to the magnetic signal detected from the inner coil 28 of FIG. 8. Likewise, third and fourth processors 112 and 114 ascertain angle with respect to the magnetic signal detected from the inner coil 28.

Next, the range and angle outputs with respect to the outer coil 20 are processed (118) to ascertain speed and steering commands for the closing rate of the seeker 30 from the autopilot computer 132. Likewise, the range and angle outputs with respect to the inner coil 28 are processed (120) to ascertain speed and steering commands for the short-range closing rate of the seeker 30 from the autopilot computer 132.

When a predetermined short range to target is detected, a signal (122) is output which activates a switch 124, which, in turn, selects the short-range speed and maneuvering commands (122) for input to the autopilot computer 126. Autopilot operation is enabled by a signal (128) from a conventional onboard flight management computer 130 on detection of sufficient proximity to activate the autopilot 126. The flight management computer 130 is coupled to an onboard communication system 132. The autopilot 126 provides short-range guidance commands for the maneuvering fins 54 and 56 of the seeker 30 (FIG. 7) to effect a successful docking of the seeker probe 30 from the tanker UAV 14 with the refueling port receptacle 22 of the mission UAV 12 (FIG. 1).

Figure 11A:
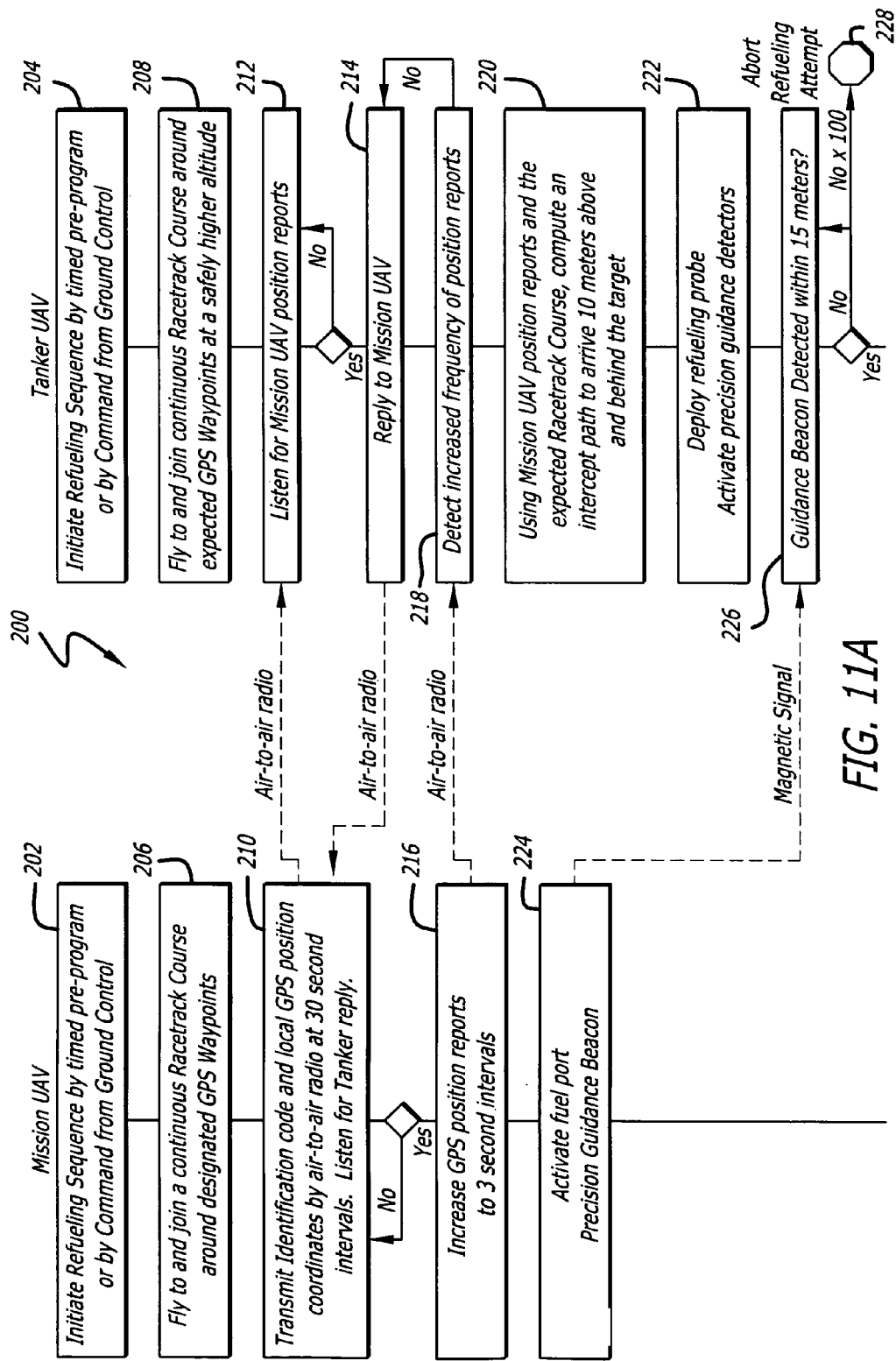
FIG. 11 is a flow diagram of an illustrative embodiment of a method for refueling an unmanned aerial vehicle in accordance with the present teachings.
Figure 11B:
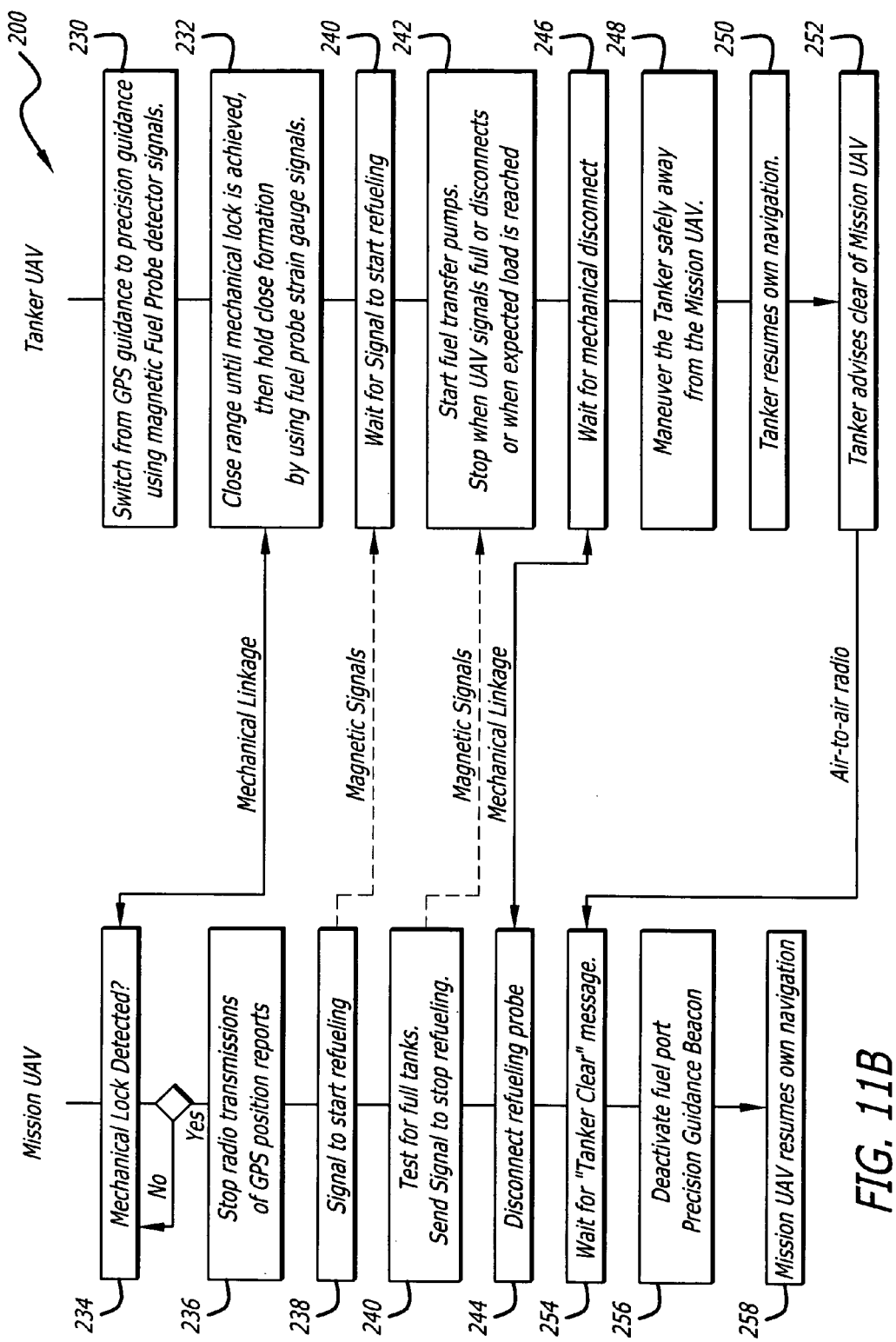

FIG. 11 is a flow diagram of an illustrative embodiment of a method for refueling an unmanned aerial vehicle in accordance with the present teachings. At steps 202 and 204, a refueling command is issued to the mission UAV 12 and the tanker UAV 14 by timed pre-program or command from ground control. At step 206, the mission UAV flies to and joins a continuous racetrack course around designated GPS waypoints. At step 208, the tanker UAV flies to and joins the continuous racetrack course around the designated GPS waypoints at a safely higher altitude. At step 210, the mission UAV transmits an identification code and local GPS position coordinates by air-to-air radio at predetermined (e.g. 30 second) intervals and listens for a tanker reply. At step 212, the tanker UAV listens for mission UAV position reports. On receipt of a position report, the tanker UAV sends a reply. On receipt of the reply (step 216), the mission UAV increases the GPS position report interval to 3 seconds, for example, and at step 224 activates the fuel port precision guidance magnetic beacon (coils 20 and 28). At step 218, the tanker detects the increased frequency of position reports and at step 220 uses the mission UAV position reports and the expected racetrack course to compute an intercept path to arrive at safe (e.g. 10 meter) distance above and behind the target.

Then, at step 222, the tanker deploys the refueling probe 16 (FIG. 1) and activates precision guidance detectors 40-43 (FIG. 9). At step 226, the tanker checks for predetermined (e.g. 15 meter) proximity. If the proximity threshold is detected, then at step 230, the tanker switches from GPS guidance to precision guidance using signals from the magnetic fuel probe seeker (30) and at step 232 closes in range until mechanical lock (successful docking) is achieved. The mechanical lock is detected by the mission UAV (step 234) and the two UAVs hold close formation using fuel probe strain gauge signals. At step 236, the mission UAV stops radio transmission of GPS position reports and, at step 238, sends a signal to start the flow of fuel. On receipt of the 'start fuel' signal, the tanker transfer fuel pumps are activated until receipt of a 'stop' signal from the mission UAV or the mission UAV disconnects or when an expected load is reached or some other preprogrammed stop condition (step 242). When its tanks are full, the mission UAV sends a signal to stop the flow of fuel (step 240) and disconnects the refueling probe (step 244). At steps 246, 248 and 250, on detection of a mechanical disconnect, the tanker maneuvers safely away from the mission UAV and resumes normal navigation. At step 252, the tanker sends a 'tanker clear' signal to the mission UAV. At steps 254, 256 and 258 the mission UAV waits for the 'tanker clear' message, deactivates the fuel port precision guidance beacon and resumes normal navigation.

In the method of FIG. 11, each step is reported by a data link to a UAV ground control station. The calculations are performed by each UAV's associated flight management computer.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A tanker comprising:
   an umbilical;
   a seeker disposed at an end of the umbilical, the seeker including detector coils positioned to point in different directions and configured to detect magnetic signals from target coils of a fueling receptacle of a mission unmanned aerial vehicle (UAV) during flight; and
   circuitry to determine a direction and a range to the fueling receptacle based on a signal output from different directional positions of the detector coils,
   the fueling receptacle for refueling the mission UAV from the tanker during flight.

2. A tanker comprising:
   an umbilical;
   a seeker disposed at an end of the umbilical, the seeker including detector coils to detect magnetic signals from target coils of a fueling receptacle of a mission unmanned aerial vehicle (UAV) during flight; and
   circuitry to determine a direction and a range to the fueling receptacle based on a signal output from the detector coils,
   the fueling receptacle for refueling the mission UAV from the tanker during flight,
   wherein the detector coils are positioned to point in different directions, and
   wherein the circuitry to determine a direction and a range to the fueling receptacle of a mission UAV is configured to detect the magnetic signals of two or more separate and distinct frequencies emanating from the target coils, each frequency being associated with a different directional position of the target coils.

3. The tanker of claim 2 wherein the detector coils comprise a first detector coil pointing in a first direction, a second detector coil pointing in a second direction and a third detector coil pointing in a third direction.

4. The tanker of claim 3 further comprising an autopilot,
   wherein the seeker includes maneuvering fins, and
   wherein the autopilot is to provide short-range guidance commands for maneuvering the fins of the seeker to dock with the fueling receptacle of the mission UAV.

5. The tanker of claim 4 wherein the tanker is an unmanned aerial vehicle configured to refuel the mission UAV during flight.

6. The tanker of claim 5 further comprising:
   an airframe, the umbilical being coupled to the airframe; and
   a fuel tank for retaining fuel for transferring through the umbilical when docked with the fueling receptacle of the mission UAV.

7. A mission unmanned aerial vehicle (UAV) comprising:
   a fueling receptacle;
   two or more target coils disposed around the refueling receptacle; and
   circuitry to excite the each target coil at separate and distinct frequencies to allow a seeker on an umbilical of a mission UAV to detect distinct magnetic signals emanating from each of the target coils for in-flight refueling,
   wherein the circuitry to excite is configured to hold the signal strength of the target coils constant to allow the seeker to accurately estimate a direction and range to the refueling receptacle.

8. The mission UAV of claim 7 wherein the target coils comprise a first target coil and a second target coil, the second target coil being disposed between the first target coil and the fueling receptacle.

9. The mission UAV of claim 8 further comprising an umbilical, wherein the fueling receptacle is located at an end of the umbilical.

10. A method for refueling a first unmanned aerial vehicle from a second unmanned aerial vehicle, the method comprising:
    flying the first and second vehicles to proximity within a predetermined range; and
    connecting an umbilical from one vehicle to the other vehicle in flight, wherein connecting includes:
    magnetically detecting a refueling receptacle of the first vehicle by:
    exciting first and second target coils disposed around the fueling receptacle with first and second respective signals at first and second separate and distinct frequencies; and
    detecting magnetic signals from the first and the second coils with first and second detector coils to determine a direction and a range to the fueling receptacle based on a signal output from the detector coils.

11. The method of claim 10 wherein connecting further includes holding signal strength of the target coils constant to allow the direction and range to be accurately estimated.

* * * * *